(12) United States Patent
Kong

(10) Patent No.: US 6,229,844 B1
(45) Date of Patent: May 8, 2001

(54) DEVICE AND METHOD FOR LOCATING A MOBILE STATION IN A MOBILE COMMUNICATION SYSTEM

(75) Inventor: Seung-Hyun Kong, Seoul (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/466,280

(22) Filed: Dec. 17, 1999

(30) Foreign Application Priority Data

Dec. 17, 1998 (KR) .................................................. 98-55907

(51) Int. Cl.[7] .............................. H04B 15/00; H04K 1/00; H04L 27/30
(52) U.S. Cl. .......................... 375/150; 375/148; 342/127; 455/456
(58) Field of Search .................................... 375/147, 148, 375/149, 150, 141, 142, 143, 144; 342/127, 145; 455/456, 457, 423

(56) References Cited

U.S. PATENT DOCUMENTS

| | | | |
|---|---|---|---|
| 5,764,188 | * | 6/1998 | Ghosh et al. .......................... 342/457 |
| 6,047,192 | * | 4/2000 | Maloney et al. ...................... 455/456 |
| 6,070,079 | * | 5/2000 | Kuwahara ............................. 455/456 |
| 6,084,928 | * | 7/2000 | Kuwahara ............................. 375/347 |
| 6,112,095 | * | 8/2000 | Wax et al. ............................ 455/456 |
| 6,157,339 | * | 12/2000 | Sato et al. ............................. 342/70 |

* cited by examiner

Primary Examiner—Chi Pham
Assistant Examiner—Phuong Phu
(74) Attorney, Agent, or Firm—Dilworth & Barrese, LLP

(57) ABSTRACT

A device and method for locating a mobile station (MS) in a mobile communication system. In the MS locating device, a first antenna and a second antenna of a base station (BS) are spaced from each other by a distance equivalent to a wavelength of an MS transmission channel multiplied by a predetermined coefficient, such as one half. A first frequency downconverter and a second frequency downconverter convert signals received from the first and second antennas to baseband signals and digitize the baseband signals to chip sample data. A first channel demodulator and a second channel demodulator recover the chip sample data received from the first and second frequency downconverters and output information about the symbol start and PN code of a specific MS signal. A controller outputs a PN code for identifying the specific MS and finger position information based on the symbol start and PN code information received from the first and second demodulators. In addition, the controller may be supplied with orthogonal code information from the demodulator; in this case, the controller will output information concerning the specific Walsh code. A symbol data extractor extracts two symbols of the specific MS from the chip sample data received from the first and second frequency downconverters based on the PN code and finger position information. An incident angle estimator estimates the incident angle of the received signal from the phase difference between the extracted two symbols. A location estimator estimates the location of the specific MS based on the estimated incident angle and the round trip delay (RTD) measured for the MS.

12 Claims, 5 Drawing Sheets

DEVICE AND METHOD FOR LOCATING A MOBILE STATION IN A MOBILE COMMUNICATION SYSTEM

PRIORITY

This application claims priority to an application entitled "Device and Method for Locating Position of Mobile Station in Mobile Communication System" filed in the Korean Industrial Property Office on Dec. 17, 1998 and assigned Ser. No. 98-55907, the contents of which are hereby incorporated by reference.

BACKGROUND OF THE INVENTION

1. Field of the Invention

The present invention relates generally to the field of wireless communications, and in particular, to a receiving device and method in a base station (BS), for locating a mobile station (MS).

2. Description of the Related Art

The FCC (Federal Communication Committee) of the U.S. provides that an MS locating service should be implemented for emergency 911 (E911) public safety services. The FCC requires that wireless carriers be able to locate an E-911 caller with an accuracy of 125 meters in 67% of the cases by October, 2001. Therefore, the CDMA (Code Division Multiple Access) standard (TIA/EIA/IS-95) as well as the IMT-2000 (International Mobile Telecommunication-2000) system makes efforts to provide the MS locating service with use of a reverse link function called "PUF (Power Up Function)". The PUF is an MS locating scheme in which an MS in an emergency situation transmits probes with gradually increased power to a plurality of adjacent BSs on a reverse channel to inform them of its position so that each of the BSs can calculate the distance between the BS and the MS by estimating the time taken for the signal to reach the BS. The PUF is provided in IS-95B. However, the PUF of IS-95B may decrease system performance since an MS increases its transmit power on its own decision. That is, the increased transmit power of the specific MS creates interference with other MSs. Then, a BS continuously performs power control to reduce the transmit power of the specific MS, thereby increasing system load. Therefore, there exists the need for a continuous positioning service which does not degrade system performance by increasing interference.

SUMMARY OF THE INVENTION

It is, therefore, an object of the present invention to provide an efficient BS receiving device and method for locating an MS.

It is another object to provide a device and method for locating an MS, which method does not degrade system performance by increasing interference.

It is another object of the present invention to provide a device and method for locating an MS from a reverse channel received from an MS in a BS using a CDMA communication system.

It is a further object of the present invention to provide a device and method for estimating the direction of an MS based on the incident angle of a reverse channel received from the MS in a BS of a mobile communication system.

It is still another object of the present invention to provide a device and method for locating an MS by estimating the direction of the MS based on the incident angle of a reverse channel received from the MS and measuring the distance between a BS and the MS based on a round trip delay in a BS of a mobile communication system.

The present invention provides an MS locating method which makes a continuous positioning service viable without causing the degraded system performance due to increased interference as observed in the PUF of IS-95B. The MS locating method according to the present invention is based on the principle that a BS measures the incident angle of a received MS signal via a reverse link channel and determines the relative direction of the MS with respect to the BS based on the measured incident angle.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The following description is conducted with the appreciation that the channel used to measure the direction of the MS relative to the BS is a reverse channel. The reverse channels include the reverse pilot channel, the reverse fundamental channel, the reverse supplemental channel, and the reverse control channel.

While two antennas configured based on the concept of an array antenna are used to receive the reverse channel signal in order to track the MS location in a BS according to the preferred embodiments of the present invention, they receive an incident signal without compensating for its phase, which incident signal is used to estimate the incident angle of the received signal based on the phase difference of a signal received through each antenna, as compared to the array antenna which increases the reception rate by compensating for the phase difference of an incident signal. Accordingly, the demodulator is simplified as compared to the conventional array antenna.

Figure 1:
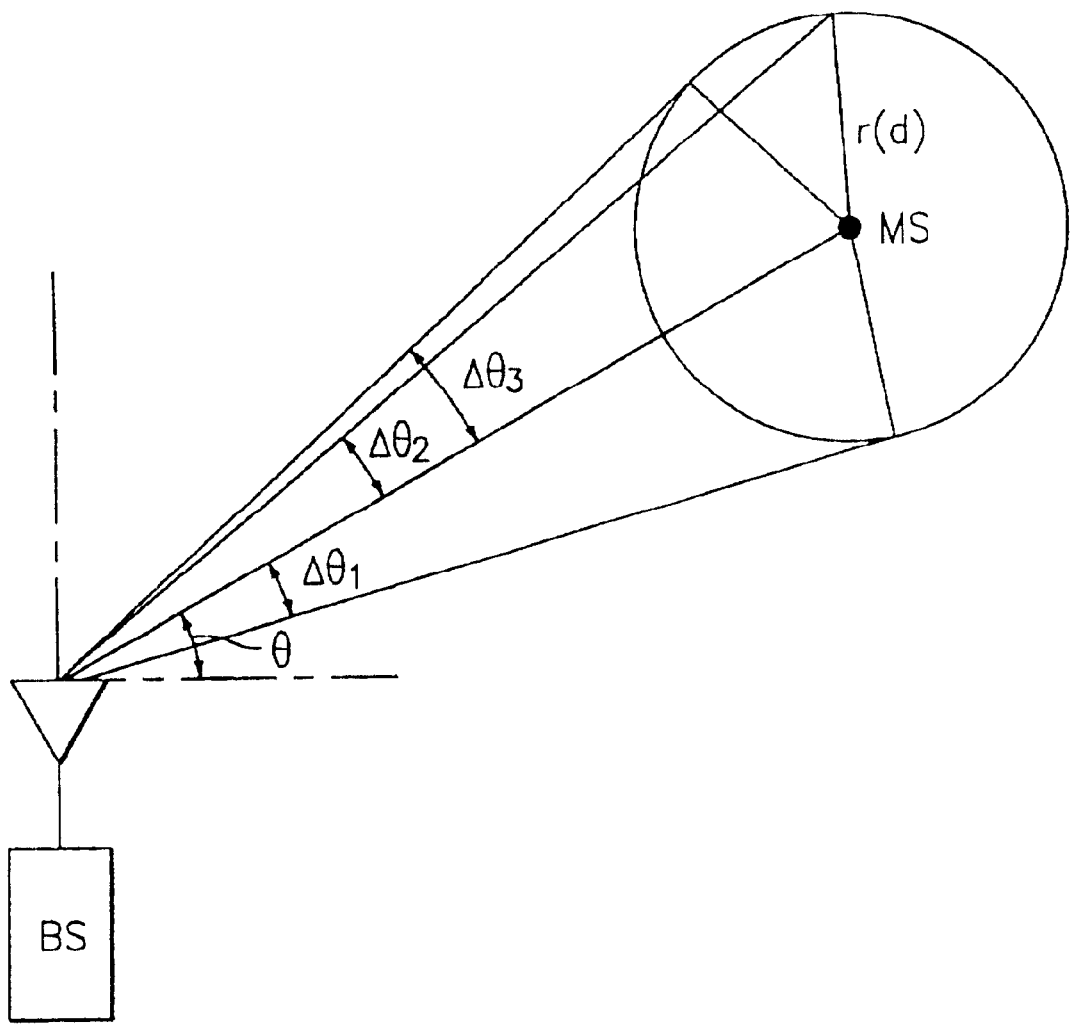
FIG. 1 illustrates the incidence of a reverse channel from an MS in a BS.

FIG. 1 illustrates the incident angles of a reverse channel signal received in a BS.

As an MS gets nearer to a BS, the MS is located more accurately in the preferred embodiments of the present invention, as shown in FIG. 1. When a reverse channel signal is transmitted from an MS located a specific distance away from a BS, the signal is scattered within a specific range around the MS because of reflecting and transmitting from and into objects near to the MS. In most cases, the scattering radius r(d) increases in direct proportion to the distance between the BS and MS. Assuming that the BS can accurately measure the incident angle of a reverse signal received from the MS, angles between BS measured directions and an actual MS direction are $\Delta\theta_1$, $\Delta\theta_2$, $\Delta\theta_3$, and the like. Hence, the measured direction error increases with the scattering radius r(d). If the specific direction error is kept lower than a certain value, then the actual locating error for the nearby MS is reduced. A maximum MS locating error is r(d) only if the round trip delay (RTD) between an MS and a BS is accurately measured. Here, the reverse channel signal can be interpreted to mean all signals received from the MS to the BS.

Figure 2:
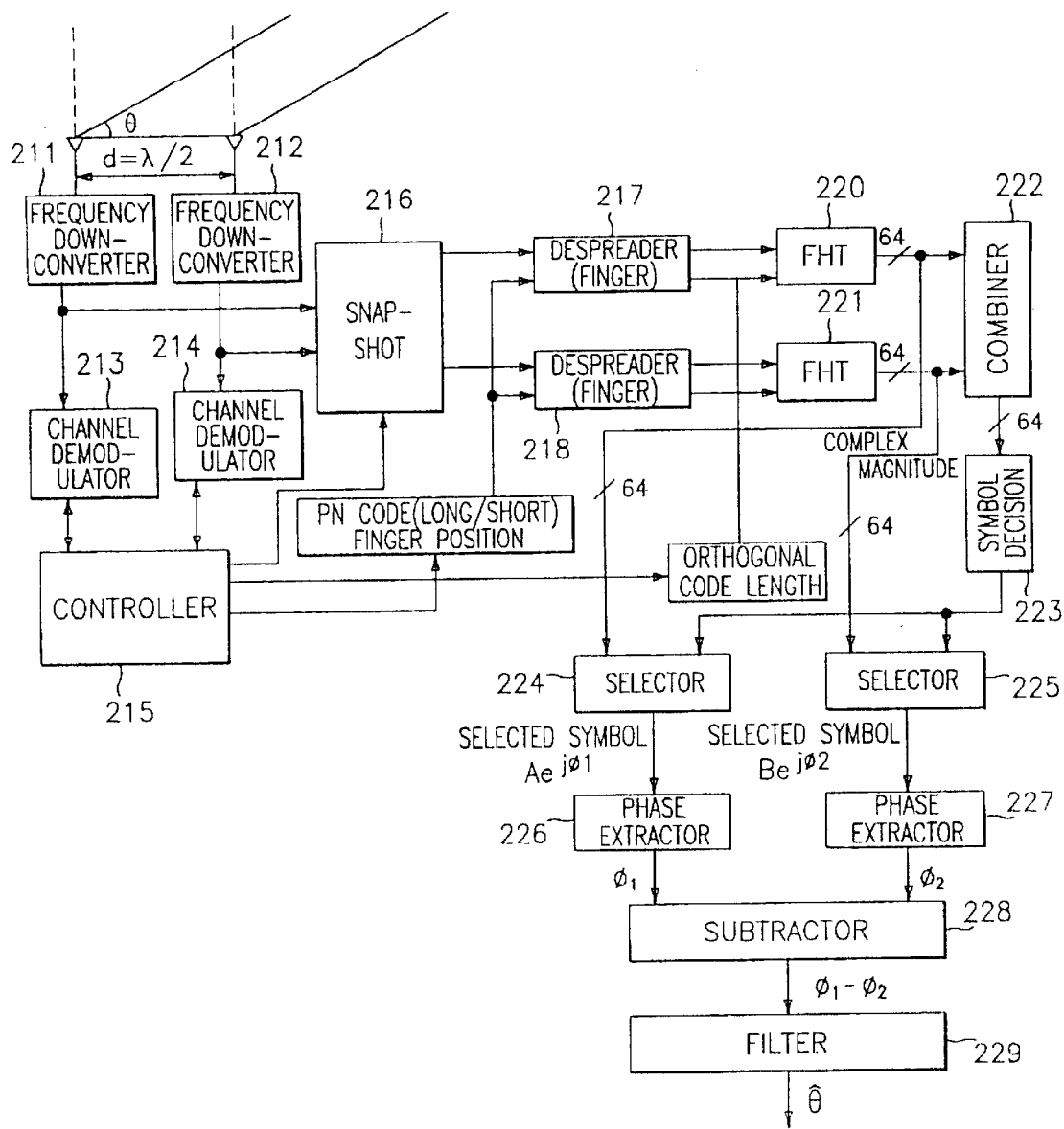
FIG. 2 is a block diagram of a BS receiver which obtains the incidence angle of a reverse signal received from an MS for MS positioning according to a first embodiment of the present invention.

FIG. 2 is a block diagram of a BS receiver which measures the incident angle of a reverse channel signal received from an MS in order to locate the MS in a mobile communication system according to a first embodiment of the present invention. As shown in FIG. 2, the BS has two antennas spaced from each other by less than a half of its receiving carrier signal wavelength to determine the direction of a reverse channel signal received from the MS. However, if the BS is sectorized and the beam width of a sector antenna is 180° or below, the distance between antennas does not need to be kept less than a half wavelength. As the distance between antennas increases, the multipath fadings of received signals are increasingly different. Due to the resulting individual phase change, it is preferable to set two antennas apart from each other by a half wavelength.

Referring to FIG. 2, frequency downconverters 211 and 212 downconvert radio signals received from corresponding antennas to intermediate frequency (IF) signals, convert the IF signals to baseband signals, and convert the baseband signals to digital signals as chip sample data through sampling and quantization. This process should be performed on signals received through the two antennas in the same manner. Therefore, the frequency downconverters 211 and 212 should have the same performance. A snapshot device 216 snapshots the chip sample data output from the frequency downconverters 211 and 212 in data symbol units (data transmitted by the MS and not spread) and stores the snapshot signals under the control of a controller 215. The size of the stored chip sample data ranges from one symbol to a plurality of symbols.

Channel demodulators 213 and 214 despread the outputs of the frequency downconverters 211 and 212 to thereby recover signals, and feed information about the symbol start, the Walsh code for the starting symbol, and the PN code of the specific reverse channel signal to the controller 215. Here, the channel demodulators 213 and 214 are typical rake receivers and function to combine signals despread in each finger, as used in a conventional BS. The controller 215 provides overall control to the BS. In the chip sample data obtained from the snapshotting, all MS signals directed to the BS are mixed. To detect the signal of a specific MS, the controller 215 transmits the short and long PN codes used in the channel demodulators 213 and 214 at the time of the snapshot, and the accurate phase (finger position) of the path component incident with the greatest reception strength or the earliest received path component obtained by a searcher to despreaders 217 and 218 for despreading chip sample data received from the snapshot device 216. The despreaders 217 and 218 are assigned to the same finger position for despreading at the same time. That is, the despreaders 217 and 218 despread the snapshot signals based on the PN code (long code/short code) and the finger position received from the controller 215. The signal of the MS, the direction of which is to be detected, is extracted in the above procedure.

Fast Hadamard Transformers (FHTs) 220 and 221 perform the correlation of the outputs of the despreaders 217 and 218 by all Walsh codes which can be obtained by the Hadamard Transformation. Performing the correlation with the Walsh Code means that each orthogonal code and the output data from the despreaders 217 and 218 are multiplied and outputted. In another embodiment, the controller 215 transmits the length of orthogonal codes corresponding to the specific MS to the FHTs 220 and 221 since detecting which code is used will take the whole process 20 ms (frame size) at most. In this case, the FHTs 220 and 221 Hadamard-transform all orthogonal codes of the transmitted length. Otherwise, the controller 215 can provide the orthogonal code corresponding to the specific MS to the HFTs 220 and 221, but in this case, the processing rate of the controller 215 is deteriorated which thereby increases the time taken for tracing the position of the MS.

A combiner 222 sums up the Hadamard-transformed data received from the FHTs 220 and 221. A symbol decider 223 estimates actual MS symbol data from the output of the combiner 222. Selectors 224 and 225 selectively output data received from the FHTs 220 and 221 at the symbol estimating time of the symbol decider 223. The snapshot device 216, the despreaders 217 and 218, the FHTs 220 and 221, the combiner 222, the symbol decider 223 and the selectors 224 and 225 can be defined as a symbol data extractor. The symbol data extractor extracts symbol data from respective chip sample data by finger position information and the PN code determined by two chip sample data streams. The PN code and the finger position information corresponding to the specific MS is determined by the channel demodulators 213 and 214, and the controller 215.

Phase extractors 226 and 227 extract phase information of the symbol data from the outputs of the selectors 224 and 225. A subtracter 228 calculates the difference between the phase information received from the phase extractors 226 and 227. A filter 229 filters the output of the subtracter 228 to thereby estimate the final reception incident angle of a specific MS. The phase difference $\phi_1-\phi_2$ directly implies the relative travel delay of the received signal at the two spaced antennas, and the filter 229 filters this difference to output a key estimation parameter for $\hat{\theta}$, the incident angle. Here, the filter is a moving average filter for continuously producing an average value over a predetermined period or an estimation filter. The phase extractors 226 and 227, the subtractor 228 and the filter 229 can be defined as an incident angle estimator, which extracts the phase difference between the symbol data extracted by the symbol data extractor and estimates the incident angle of the received signal determined by the extracted phase difference. A position estimator (not shown) can estimate a specific MS position by using the incident angle of the received signal from the specific MS. The position estimator measures the distance between the BS and the MS based on an RTD, and then determines the final position of the MS based on the direction and the distance. The position estimator can be embodied by the controller 215 shown in the figure or by using a separate processor.

As described above, the snapshot-based MS locating method according to the present invention is advantageous in that the location of any MS can be determined from snapshot data. To do so, the controller 215 extracts the signals of an MS by feeding the PN codes (long codes/short codes) and finger positions of the MS which is transmitting a reverse channel signals to the BS to the despreaders 217 and 218 during the snapshotting. Then, the controller 215 calculates a reception incident angle from the phase difference between the two extracted signals, for use in MS positioning.

Figure 3:
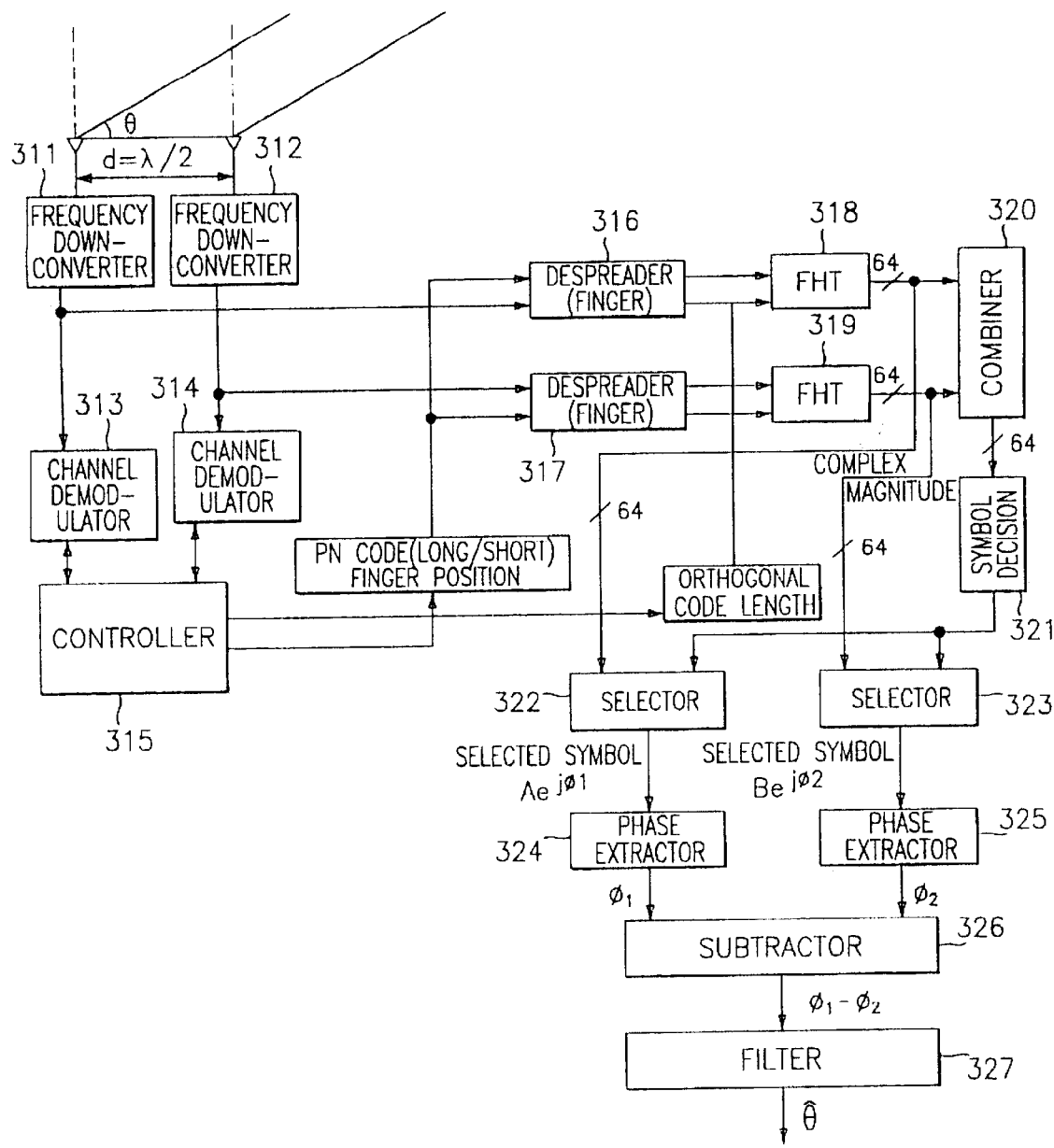
FIG. 3 is a block diagram of a BS receiver which obtains the incidence angle of a reverse signal received from an MS for MS positioning according to a second embodiment of the present invention.

FIG. 3 is a block diagram of a BS receiver for obtaining an incident angle of a reverse channel signal received from an MS in order to locate the MS in a mobile communication system according to a second embodiment of the present invention. In the second embodiment, the MS location is determined without snapshotting received chip sample data so that the incident angle of a reverse channel signal can be measured faster than in the first embodiment shown in FIG. 2.

Referring to FIG. 3, frequency downconverters 311 and 312 downconvert radio signals received from corresponding antennas to intermediate frequency (IF) signals, convert the IF signals to baseband signals, and convert the baseband signals to digital signals through sampling and quantization. This process should be performed on signals received through the two antennas in the same manner. Therefore, the frequency downconverters 311 and 312 should have the same performance. Channel demodulators 313 and 314 despread the outputs of the frequency downconverters 311 and 312 to thereby recover signals and feed information about the symbol time, the Walsh code for the starting symbol, and the PN code of the signal transmitted by a specific MS to a controller 315. Here, the channel demodulators 313 and 314 are typical rake receivers and function to combine signals despread in each finger, as used in a conventional BS.

The controller 315 provides overall control to the BS. To detect a signal of a specific MS, the controller 315 transmits the short and long PN codes used in the channel demodulators 313 and 314, and the phase (finger position) of the path component incident with the greatest reception strength or the earliest received path component obtained by a searcher to despreaders 316 and 317. The despreaders 317 and 318 despread the signals received from the frequency downconverters 311 and 312 based on the PN code (long code/short code) and the finger position received from the controller 315. Here, the despreading is performed using the same finger position in the despreaders 316 and 317. The signal of the MS the direction of which is to be detected is extracted in the above procedure.

FHTs 318 and 319 perform the correlation of the outputs of the despreaders and 317 by all Walsh codes which can be obtained by the Hadamard Transformation. It will be understood by those skilled in the art that the second embodiment, like the first embodiment, can have the controller 315 provide the FHTs 318 and 319 with either the orthogonal code length or the orthogonal code. A combiner 320 sums up the Hadamard-transformed data received from the FHTs 318 and 319. A symbol decider 321 estimates actual MS symbol data from the output of the combiner 320. Selectors 322 and 323 selectively output data received from the FHTs 318 and 319 at the symbol data estimating time. Phase extractors 324 and 325 extract phase information of symbol data from the outputs of the selectors 322 and 323. A subtracter 326 calculates the difference between the phase information received from the phase extractors 324 and 325.

A filter 327 filters the output of the subtracter 326 to thereby produce an estimation parameter ($E[\phi 1-\phi 2]$) for the final reception incident angle of a specific MS. Here, the filter is a moving average filter for continuously producing an average value over a predetermined period or an estimation filter. The direction of the MS can be estimated from the incident angle of the MS signal. The controller 315 measures the distance between the BS and the MS based on an RTD, and then determines the final position of the MS based on the direction and the distance.

In accordance with the second embodiment, the controller can afford to provide PN code (long code/short code) information and finger position to the despreaders only when a received MS signal has a constant finger position (i.e., path) even for a short time, because the received chip sample data is not snapshot. It can be assumed that an MS signal has a constant finger position if the path of a reverse channel signal is not changed much, an MS is in a line-of-sight path, or a despreading time (or a processing time) is very short. That is, the structure of FIG. 3 can estimate a signal incident angle for one MS. However, parallel processing from the despreaders to the filter enables estimation of the incident angles of reverse signals received from a plurality of MSs at one time.

Figure 4:
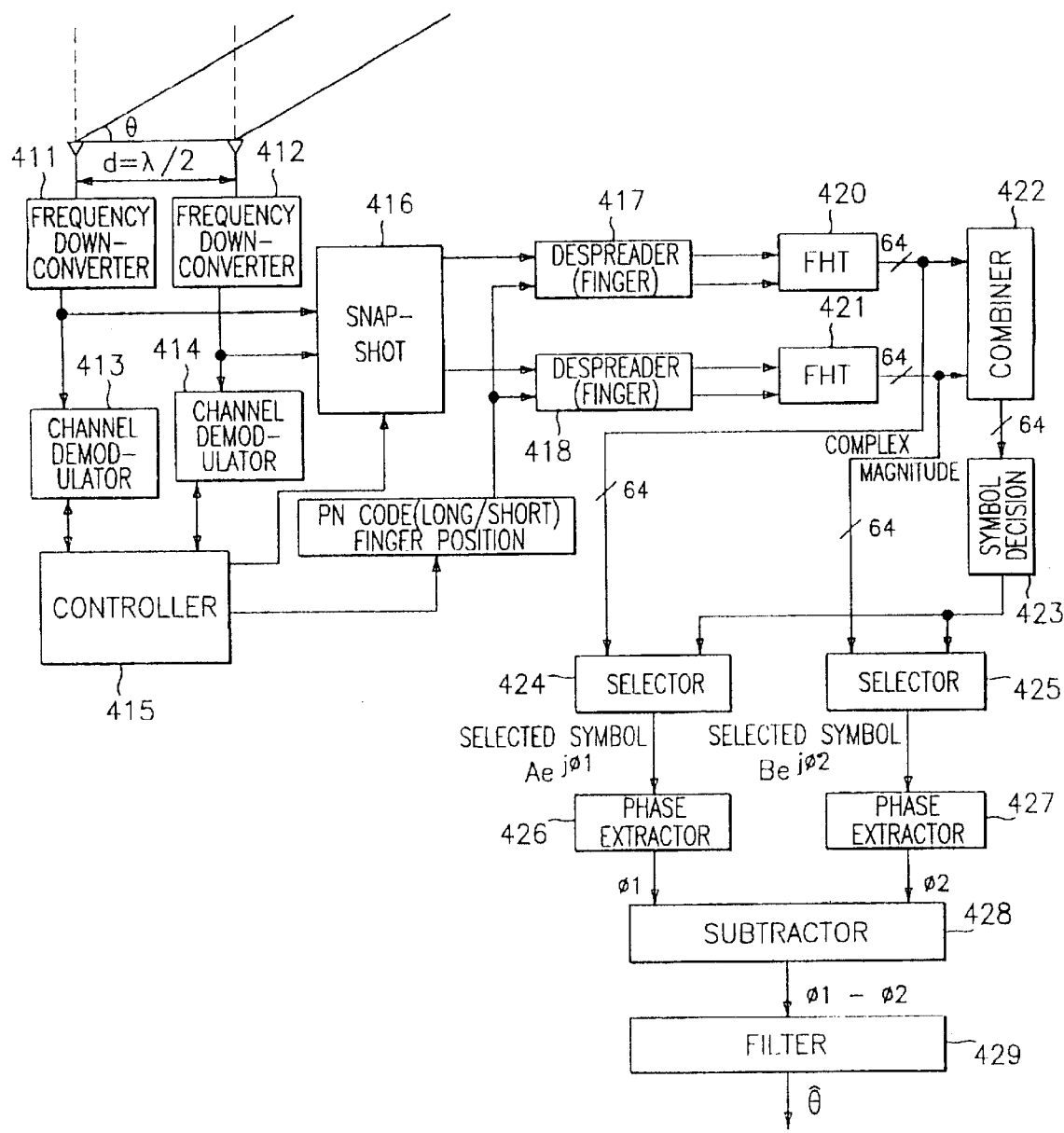
FIG. 4 is a block diagram of a BS receiver which is similar to the BS receiver shown in FIG. 2, except that the controller does not provide information about the orthogonal code of the MS signal to the Fast Hadamard Transformers (FHTs), according to a third embodiment of the present invention.

FIG. 4 is a block diagram of a BS receiver for obtaining the incident angle of a reverse channel signal received from a specific MS in a mobile communication system according to a third embodiment of the present invention. The BS receiver shown in FIG. 4 is the same as that shown in FIG. 2 in configuration except that a controller 415 does not feed an orthogonal code length to FHTs 420 and 421. Thus, the FHTs 420 and 421 correlate then input signal to all orthogonal codes of all lengths. On the other hand, if the FHTs 420 and 421 receive the orthogonal code length from the controller 415 as in FIG. 2, Hadamard transformation can be performed more efficiently than correlation to all the orthogonal codes of all length. A phase difference is calculated between two signals detected from the Hadamard transformation, and then the incident angle of the reverse channel signal is estimated based on the phase difference.

Figure 5:
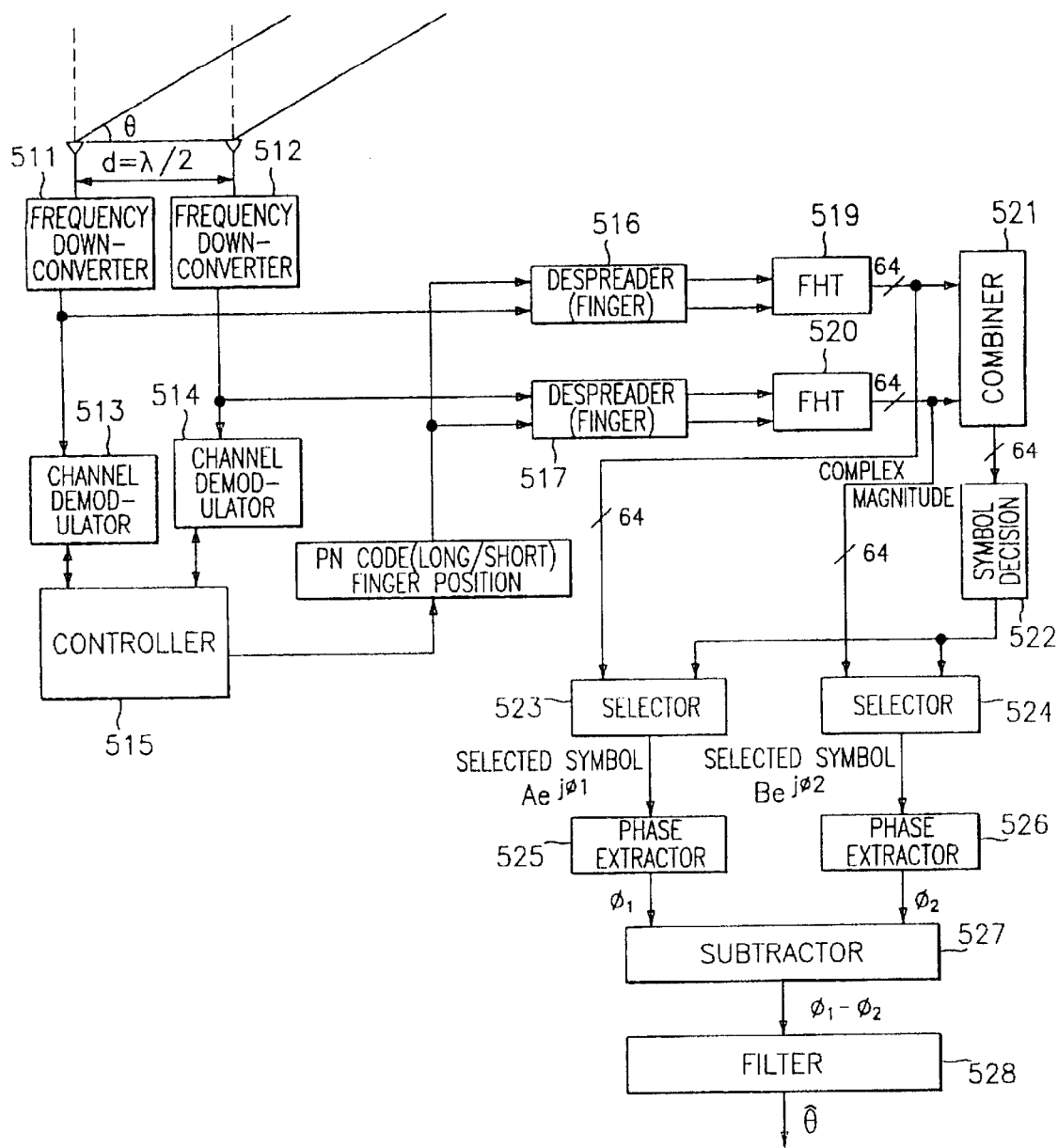
FIG. 5 is a block diagram of a BS receiver which is similar to the BS receiver shown in FIG. 3, except that the controller does not provide information about the orthogonal code of the MS signal to the Fast Hadamard Transformers (FHTs), according to a fourth embodiment of the present invention.

FIG. 5 is a block diagram of a BS receiver for obtaining the incident angle of a reverse channel signal received from a specific MS in a mobile communication system according to a fourth embodiment of the present invention. The BS receiver shown in FIG. 5 is the same in configuration as that shown in FIG. 3 except that a controller 515 does not feed an orthogonal code length to FHTs 519 and 520. Thus, the FHTs 519 and 520 correlate the input signal to all orthogonal codes. On the other hand, if the FHTs 519 and 520 receive the orthogonal code length from the controller 515 in some of the previous embodiments, Hadamard transformation can be performed more efficiently than correlation to all the orthogonal codes. A phase difference is calculated between two signals detected from the Hadamard transformation, and then the incident angle of the reverse channel signal is estimated based on the phase difference.

As described above, the preferred embodiments of the present invention can determine the locations of all MSs without changing conventional physical layers. The conventional PUF increases interference between MSs, but according to the preferred embodiments of the present invention, a BS can more efficiently locate an MS using a reverse signal received from the MS without the need for any specific action of the MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile station (MS) locating device for a base station (BS) in a mobile communication system, comprising:
- a first antenna and a second antenna spaced from each other by a distance equivalent to a wavelength of an MS transmission channel multiplied by a predetermined coefficient;
- at least one frequency downconverter for converting signals received from the first and second antennas to baseband signals and digitizing the baseband signals to a first and a second chip sample data;
- a symbol data extractor for extracting two symbols from the first and second chip sample data based at least on a pseudo noise (PN) code and finger position information corresponding to a specific MS determined by the first and second chip sample data;
- an incident angle estimator for estimating an incident angle of the received signals from a phase difference between the extracted two symbols; and
- a location estimator for estimating a location of the specific MS based on the estimated incident angle and a round trip delay (RTD) measured for the MS.

2. The MS locating device of claim 1, wherein the predetermined coefficient is less than one half.

3. The MS locating device of claim 1, wherein the incident angle estimator comprises:
- a phase extractor for extracting phases of the extracted two symbols;
- a subtracter for calculating a phase difference between the extracted two phases; and
- a filter for filtering the phase difference and estimating the incident angle of the MS signal.

4. The MS locating device of claim 1, wherein the symbol data extractor comprises:
- at least one despreader for despreading the first and second chip sample data with the PN code at a time point determined by the finger position information;
- at least one fast Hadamard Transformer (FHT) for despreading the output of the at least one despreader with all orthogonal codes generated by Hadamard transformation;
- a combiner for summing up two despread signals received from the at least one FHT;
- a symbol decider for generating a symbol data estimating time from an output of the combiner; and
- a selector for extracting symbol data at the symbol data estimating time from the despread signal received from the at least one FHT.

5. The MS locating device of claim 4, wherein the symbol data extractor further comprises a snapshot device for storing the first and second chip sample data received from the at least one frequency downconverter in symbol data units and outputting the stored chip sample data to the at least one despreader.

6. The MS locating device of claim 1, wherein the symbol data extractor extracts the two symbols based also on an orthogonal code length corresponding to a specific MS determined by the first and second chip sample data.

7. A mobile station (MS) locating method in a mobile communication system, comprising the steps of:
- converting received signals to baseband signals through a first antenna and a second antenna spaced from each other by a distance equivalent to a wavelength of an MS transmission channel multiplied by a predetermined coefficient;
- digitizing the baseband signals to first and second chip sample data;
- extracting first and second symbols from the first and second chip sample data based at least on a pseudo noise (PN) code and finger position information corresponding to a specific MS determined by the first and second chip sample data;
- estimating an incident angle of the received signals from a phase difference between the extracted two symbols; and
- estimating the location of the specific MS based on the estimated incident angle and a round trip delay (RTD) measured for the MS.

8. The MS locating method of claim 7, wherein the predetermined coefficient is less than one half.

9. The MS locating method of claim 7, wherein the incident angle estimating step comprises the steps of:
- extracting phases of the extracted two symbols;
- calculating a phase difference between the extracted two phases;
- filtering the phase difference; and
- estimating the incident angle of the MS signals.

10. The MS locating method of claim 9, wherein the symbol data extracting step comprises the steps of:
- despreading the first and second chip sample data with the PN code at a time point determined by the finger position information;
- despreading the first and second PN-despread signals with all orthogonal codes generated by Hadamard transformation;
- summing up the orthogonally despread signals;
- generating a symbol data estimating time from the sum; and
- extracting first and second symbol data at the symbol data estimating time from the orthogonally despread signals.

11. The MS locating method of claim 10, wherein the symbol data extracting step further comprises the step of storing the first and second chip sample data in symbol data units and outputting the stored chip sample data for the PN-despreading.

12. The MS locating device of claim 7, wherein the symbol data extractor extracts the two symbols based also on an orthogonal code length corresponding to a specific MS determined by the first and second chip sample data.

* * * * *